A D. KILGORE.
TIRE PLY TURN-UP AND PRODDER DEVICE.
APPLICATION FILED MAR. 24, 1920.

1,420,930.

Patented June 27, 1922.

A Dewey Kilgore
INVENTOR

BY Fetherstonhaugh & Co.

ATTORNEYS

UNITED STATES PATENT OFFICE.

A. DEWEY KILGORE, OF AKRON, OHIO.

TIRE-PLY TURN-UP AND PRODDER DEVICE.

1,420,930. Specification of Letters Patent. Patented June 27, 1922.

Application filed March 24, 1920. Serial No. 368,343.

*To all whom it may concern:*

Be it known that I, A. DEWEY KILGORE, a citizen of the United States, residing at 591 South Main Street, in the city of Akron, in the county of Summit and State of Ohio, have invented certain new and useful Improvements in Tire-Ply Turn-Up and Prodder Devices, of which the following is a specification.

My invention relates to improvements in tire ply turn-up and prodding devices and the object of the invention is to devise means for mechanically separating the plies from the core in order that they may be turned back over the bead of the tire carcass. A further object is to construct a device which will effect the separation of the plies from the core much more quickly and safely than has hitherto been the case and a still further object is to construct a device which can be swung back out of the way when not in use.

My invention consists of a main frame swingably and adjustably supported, an adjustable prodder support, a prodder, a sliding bar suitably mounted on the main frame, said prodder support adjustably secured to one end of the bar, a cross shaft, a support roll freely mounted on said cross shaft, a hand lever secured to said cross shaft, a slidable member on said bar, a lever for securing the member to the bar, and a link pivotally connected at one end to the member and at the other end to the aforesaid hand lever intermediately of its length, all as hereinafter more particularly described and illustrated in the accompanying drawing in which:—

Figure 1:
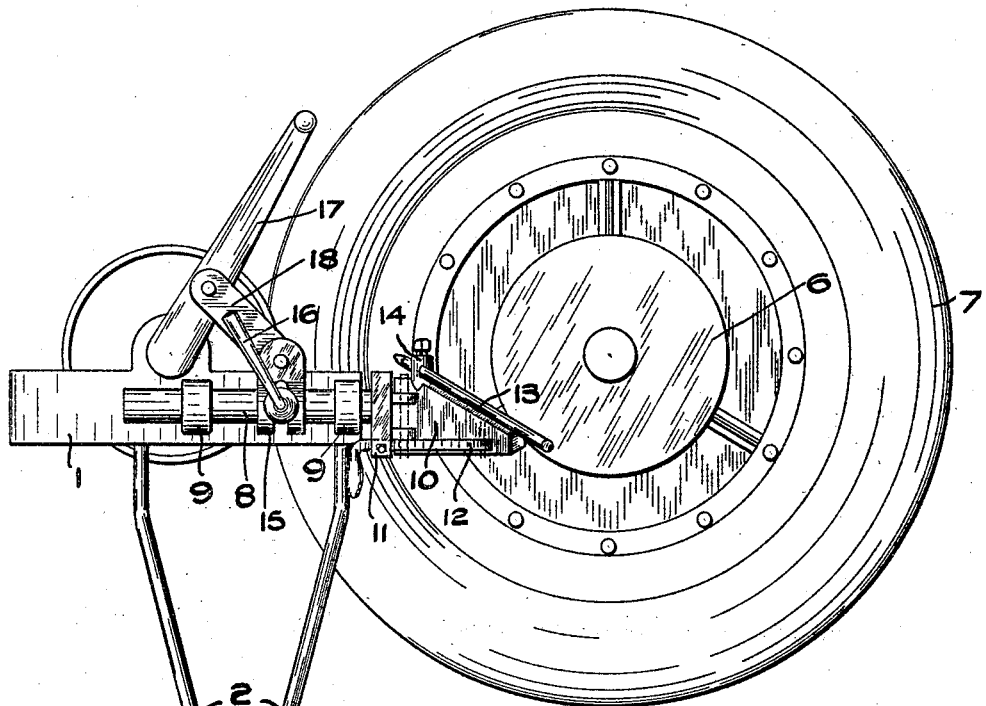
Figure 2:
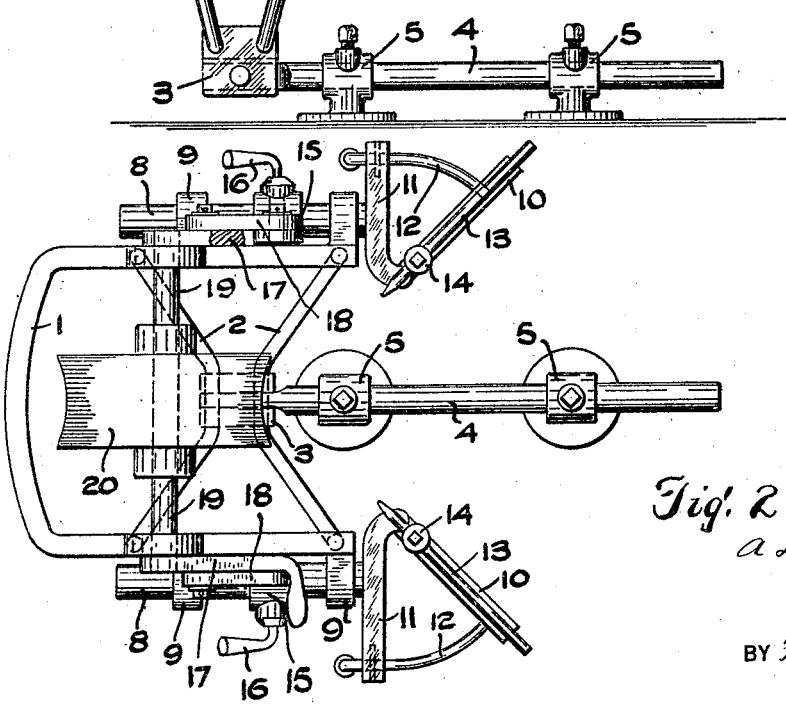

Fig. 1 represents a side elevation of my device showing the same applied to a tire carcass mounted on a suitable chuck, and Fig. 2 is a plan view thereof.

Like characters of reference indicate corresponding parts in the different views.

1 is the main frame suitably supported on the brackets 2 connected at their lower ends to the joint 3 which is hinged to a lateral bar 4 slidably mounted in the bearings 5.

6 is the chuck and 7 is the tire carcass. 8 is a bar slidably mounted in bearings 9 secured to the main frame. 10 is a prodder support hinged to an extension 11 on one end of the bar 8, and 12 is a lever connected at one end to the prodder support and adjustably secured in the extension 11 whereby the prodder support may be adjusted to any desired inclination, 13 is the prodder adjustably secured on the prodder support by the clamp 14.

15 is a member adjustably secured to the bar 8 by the lever 16. 17 is a hand lever and 18 is a connecting link pivotally connected at one end to the member 15 and at the other end to the lever 17 intermediately of its length.

The lever 17 is secured to a cross shaft 19 freely mounted in suitable bearings in the frame 1. 20 is a roll support freely mounted on the shaft 19.

The operation of the device is as follows:

After the tire carcass 7 has been formed on the core which is mounted on the chuck 6 in the ordinary manner and revolved at the desired speed, the frame 1 is swung into the desired position so that the support roll 20 engages the periphery of the tire carcass, the bar 4 being suitably adjusted in the bearings 5. The prodders 13 are suitably adjusted in the prodder supports 10 and the prodders set at the desired inclination by adjusting the levers 12 and 16. The member 15 is secured to the slidable rod 8 by tightening up the lever 16. The device is now ready for use and it will be seen that by actuating the lever 17 the rods 8 will be moved outwardly thus bringing the prodders 13 into engagement with the carcass and between the carcass and the core and effecting the necessary separation and turning up of the plies over the bead.

Hitherto the prodder has used by the operator simply by holding it in his hands in order to turn up the plies of the material forming the carcass of the tire over the bead of the same. This required considerable strength and power as the plies adhered strongly to the core. A rough spot or sand hole on the core which revolves at a very rapid speed on the chuck would cause the prodder to catch and give the operator a considerable jolt resulting often in injury. By the use of my device the same power is exerted on the prodder by the operator at a safe distance and with much greater facility than would be the case if the prodder were used by hand. In addition the plies on both sides of the tire carcass can be separated and turned up simultaneously whereas by hand they would have to be done separately or two men required.

What I claim as my invention is.

1. In a tire ply turn-up and prodding device, the combination of a rotatable tire core prodding means, and means for sliding said prodding means into engagement with the carcass of the tire.

2. In a tire ply turn-up and prodding device, the combination of a rotatable tire core prodding means, and means for sliding said prodding means into engagement with each side wall of the tire carcass.

3. In a tire ply turn-up and prodding device, the combination of a rotatable tire core prodding means, means for sliding said prodding means into engagement with the carcass and a hand lever for actuating the said sliding means.

4. In a tire ply turn-up and prodding device, the combination of a rotatable tire core prodding means, means for sliding said prodding means into engagement with each side wall of the carcass and a hand lever for actuating said sliding means.

5. In a tire ply turn-up and prodding device, the combination of a rotatable tire core, a prodder, a suitably supported slidable bar, said prodder attached to said slidable bar and means for sliding the bar for throwing the prodder into engagement with the tire carcass.

6. In a tire ply turn-up and prodding device, the combination of a rotatable tire core, a prodder, a suitably supported slidable bar, said prodder adjustably attached to said slidable bar and means for sliding the bar for throwing the prodder into engagement with the tire carcass.

7. In a tire ply turn-up and prodding device, the combination of a rotatable tire core, a prodder, a suitably supported slidable bar, said prodder attached to said slidable bar, a suitably mounted hand lever, and means for connecting the hand lever to the slidable bar.

8. In a tire ply turn-up and prodding device, the combination of a rotatable tire core, a prodder, a suitably supported slidable bar, said prodder attached to said slidable bar, a suitably mounted hand lever, a member adjustably secured to said slidable bar and a connecting link pivotally connected at one end to the said member and at the other end to the lever intermediately of its length.

9. In a tire ply turn-up and prodding device, the combination of a rotatable tire core, a prodder support, a prodder adjustably secured on such prodder support, a suitably supported slidable bar, said prodder support hinged to said slidable bar, a lever secured at one end to the prodder support and adjustably secured to the slidable bar and means for sliding the bar for throwing the prodder into engagement with the tire carcass.

10. In a tire ply turn-up and prodding device, the combination of a rotatable tire core, a prodder support, a prodder adjustably secured on such prodder support, a suitably supported slidable bar, said prodder support hinged to said slidable bar, a lever secured at one end to the prodder support and adjustably secured to the slidable bar, a member adjustably secured to the slidable bar, a hand lever and a connecting link pivotally connected at one end to the said member and at the other end to the lever intermediately of the length of the same.

11. In a tire ply turn-up and prodding device, the combination of a rotatable tire core, a suitably supported main frame, bars slidable in bearings on the main frame, a prodder support suitably hinged to one end of each bar, a prodder adjustably secured on each prodder support, means for adjustably securing the prodder support at a suitable inclination to the slidable bar, a cross shaft, a lever secured at each end of the cross shaft, a member adjustably secured to each slidable bar and a connecting link pivotally connected to each member and to each hand lever intermediately of the length of the same.

12. In a tire ply turn-up and prodding device, the combination of a rotatable tire core, a suitably supported main frame, bars slidable in bearings on the main frame, a prodder support suitably hinged to one end of portions of each bar, a prodder adjustably secured on each prodder support, means for adjustably securing the prodder support at a suitable inclination to the slidable bar, a crossshaft, a member adjustably secured to each slidable bar, a connecting link pivotally connected to each member and to each hand lever intermediately of the length of the same, and a supporting roll freely mounted on the cross shaft.

13. In a tire ply turn-up and prodding device, the combination of a rotatable tire core, a suitably supported main frame, bars slidable in bearings on the main frame, a prodder support suitably hinged to one end of each bar, a prodder adjustably secured on each prodder support, means for adjustably securing the prodder support at a suitable inclination to the slidable bar, a cross shaft, a lever secured at each end of the cross shaft, a member adjustably secured to each slidable bar, a connecting link pivotally connected to each member and to each hand lever intermediately of the length of the same, a supporting roll freely mounted on the cross shaft, said supporting roll engaging the periphery of the carcass and means for swinging the frame out of the operative position.

14. In a tire ply turn-up and prodding device, a main frame, bars slidable in bearings on the main frame, a prodder support suitably hinged to one end of each bar, a prodder adjustably secured on each prodder support, means for adjustably securing the prodder support at a suitable inclination to the slidable bar, a cross shaft, a lever secured at each end of the cross shaft, a member adjustably secured to each slidable bar, a connecting link pivotally connected to each member and to each hand lever intermediately of the length of the same, a supporting roll freely mounted on the cross shaft, depending brackets secured to the main frame, a joint suitably secured to the lower end of the depending brackets, a horizontal bar, and bearings slidably supporting the horizontal bar, one end of said bar hinged to the said joint.

15. In a device of the character described, the combination with a rotatable tire core, of means operable to effect separation of portions of the tire from the core, and means to actuate said separating means.

16. In a device of the character described, the combination with a tire core carrying a tire carcass thereon, of means operable to effect separation of portions of the tire plies from the core and the turning back of such portions over the tire bead, and means for actuating said separating means.

17. In a device of the character described, the combination with a rotatable tire core carrying a tire carcass thereon, of means operable to effect separation of portions of the tire plies from the core and the turning back of such portions over the tire bead, and means for actuating said separating means.

18. In a device of the character described, the combination with a tire core, of means operable to simultaneously strip or separate the portions of the tire plies from opposite sides of the core, and means for actuating said stripping means.

19. In a device of the character described, the combination with a rotatable tire core, of means operable to simultaneously strip or separate portions of the tire plies from opposite sides of the core, and means for actuating said stripping means.

20. A device of the character described, the combination with a tire core carrying a tire carcass thereon, of means operable to simultaneously free portions of the tire plies from opposite sides of the core and to effect the turning back of said portions from the tire base, and means to actuate said separating and turning means.

21. An arrangement according to the preceding claim in which the core is rotatable.

22. A device of the character described comprising a rotatable core carrying a tire carcass thereon, a roller engageable with the periphery or tread of the tire, members operable to separate portions of the tire from the core, and means to actuate said members.

23. A device of the character described comprising in combination a rotatable tire core, supporting means engageable with the periphery of a tire carcass carried on the core, tire separating tools supported for movement in the direction of said separating means to effect separation of portions of the tire plies from the core, and means to actuate said tools.

24. A device of the character described comprising a rotatable core support, tools insertible between the core and the tire carried thereon to effect separation of portions of the tire plies from the core and the turning back of such portions over the tire bead, and means for supporting and actuating said tools.

25. A device of the character described comprising the combination with a tire core, of opposing stripping members movable relatively to the core to effect separation of portions of the tire plies from opposite sides of the core, and means for moving said members.

26. A device of the character described comprising in combination a rotatable tire core, stripping members supported on opposite sides of the core and movable relatively thereto, and means for moving said members.

In testimony whereof I affix my signature.

A. DEWEY KILGORE.